(12) United States Patent
Morineau et al.

(10) Patent No.: US 7,318,345 B2
(45) Date of Patent: Jan. 15, 2008

(54) METHOD OF MEASURING THE HEIGHT OF A LIQUID USING A HIGH-FREQUENCY LINE PROBE

(76) Inventors: Jacques Morineau, 44, Chemin des Guignes, 49125 Tierce (FR); Roger Simonny, Les Cours, 37120 Courcoue (FR)

(*) Notice: Subject to any disclaimer, the term of this patent is extended or adjusted under 35 U.S.C. 154(b) by 145 days.

(21) Appl. No.: 10/535,111

(22) PCT Filed: Nov. 14, 2003

(86) PCT No.: PCT/FR03/03382

§ 371 (c)(1),
(2), (4) Date: May 16, 2005

(87) PCT Pub. No.: WO2004/046662

PCT Pub. Date: Jun. 3, 2004

(65) Prior Publication Data

US 2006/0096368 A1    May 11, 2006

(30) Foreign Application Priority Data

Nov. 15, 2002    (FR) .................................. 02 14318

(51) Int. Cl.
*G01F 23/24*    (2006.01)
(52) U.S. Cl. .................................................. 73/304 R
(58) Field of Classification Search ............... 73/304 R
See application file for complete search history.

(56) References Cited

U.S. PATENT DOCUMENTS

| | | | | |
|---|---|---|---|---|
| 4,284,951 A | * | 8/1981 | Dahl et al. | 324/430 |
| 6,237,412 B1 | | 5/2001 | Morimoto | |
| 6,486,679 B1 | * | 11/2002 | Holt | 324/610 |

FOREIGN PATENT DOCUMENTS

| | | |
|---|---|---|
| EP | 0 360 405 | 3/1990 |
| EP | 0 405 835 A2 | 1/1991 |
| FR | 1 121 661 A | 8/1956 |

* cited by examiner

*Primary Examiner*—Hezron Williams
*Assistant Examiner*—Paul M West
(74) *Attorney, Agent, or Firm*—Scully, Scott, Murphy & Presser, P.C.

(57) ABSTRACT

The invention relates to a method of measuring the height of a liquid using a high-frequency line probe. According to the invention, a comparison is made, on an electric circuit (3) which is supplied with high-frequency alternating current, between the impedance of a coaxial or non-coaxial line probe (1) and a reference resistor (17), using a resistive measuring bridge (7). The probe (1), which is submerged in a lank of the fluid of which the height is to be determined, forms one measuring arm of the measuring bridge and the above-mentioned reference resistor (17) forms an opposite arm of the measuring bridge, the comparison signal resulting from the alternative measurement of the signals on each of said arms using a suitable detector. Subsequently, the comparison signal is processed in order to obtain the calculation of the height of the liquid according to the permittivity thereof, the length of the probe (1) and the circuit (3) power line frequency.

9 Claims, 1 Drawing Sheet

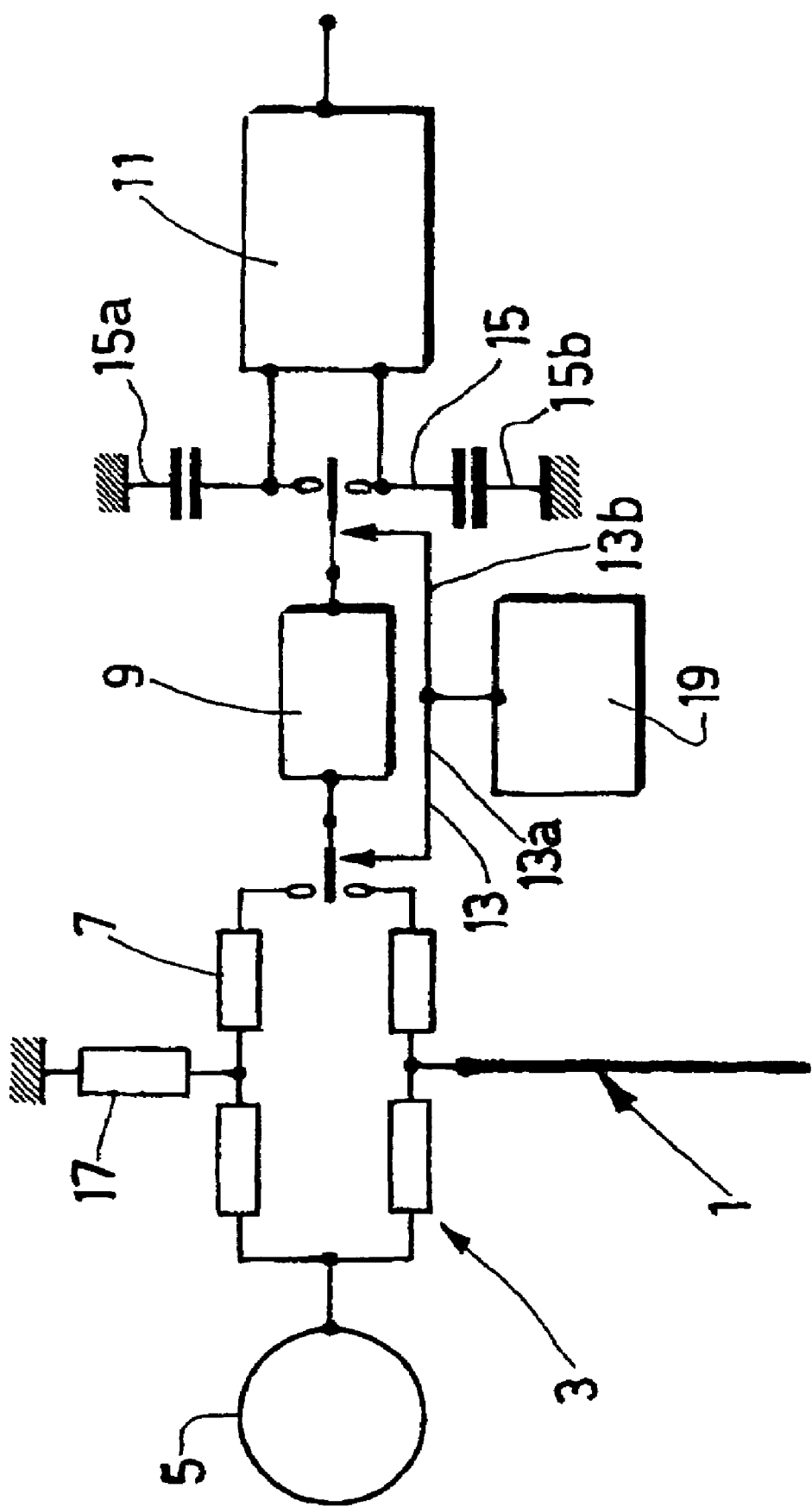

METHOD OF MEASURING THE HEIGHT OF A LIQUID USING A HIGH-FREQUENCY LINE PROBE

The invention relates to a method of measuring the height of a liquid using a high-frequency line probe and the probe used.

Various probes for measuring the height of a liquid in a tank are known. The float probe is the oldest. The information is obtained from a triangulation using control arms to drive a magnet inside a tank. The field outside the latter drives an optical encoder or is captured by a Hall-effect probe. In the former case, the system is cumbersome and expensive, and in the latter case, it is inaccurate and still expensive.

Microwave probes are based on the radar principle. The wave emitted by a directional antenna is transmitted and received. After reflection, the time difference between transmission and reception is measured. The consumption and cost of production are high.

In pulse probes, a pulse is sent over a coaxial line partially immersed in the liquid to be measured. On passing through the liquid, a portion of the energy is reflected. The power at the source varies according to the time difference and therefore the level of the liquid. This method works well for high-permittivity liquids, but is very inaccurate and reproducibility is poor for measuring low-permittivity liquids like hydrocarbons.

The invention seeks to overcome these problems by proposing a measurement method based on measuring the characteristics of a coaxial or non-coaxial high-frequency line, in particular the impedance, through its modulus, its argument or even its real or imaginary part, which vary according to its physical dimensions and dielectric sound characteristics.

The method according to the invention is limited to measuring the impedance modulus of the probe line.

The method according to the invention is characterized in that it consists in making on an electric circuit, powered with high-frequency alternating current, a comparison between the impedance of a coaxial or non-coaxial line probe and a reference resistor, using a resistive measuring bridge, the probe submerged in a tank of fluid of which the height is to be determined forming a measuring arm and said reference resistor forming an opposite arm of the measuring bridge, the comparison signal resulting from the alternate measurement of the signal on each of the arms of the bridge using a suitable detector, and in processing the comparison signal in order to obtain the calculation of the height of the liquid according to its permittivity, the length of the probe and the circuit power supply frequency.

The probe advantageously comprises a simple tube or rod or metallic wire of any type and of straight-line shape, extending over the height of the liquid in the tank to be measured. Its length can vary from 0.1 to 10 m.

This probe is in fact an open-ended, high-frequency line that is therefore not in contact with the bottom of the tank, comprising the dielectric part formed by the liquid contained in the tank and the core of which is complemented by the tank enclosure.

By determining the impedance of such a high-frequency probe it is possible to determine its impedance modulus characteristic, fairly accurately, with current electronic processing means and to obtain a linear response for the liquid height measuring signal with sufficient accuracy, better than 1%; such a measurement can also be made with surrounding liquids of low permittivity, such as can be found in oil products.

The frequency domain of the probe power supply is advantageously between 4 and 20 MHz.

The reference resistor is advantageously chosen to be roughly equal to that of the impedance modulus of the probe at mid-height of the liquid in the tank.

Processing of the comparison signal is advantageously performed in two stages, a logarithmic amplifier stage followed by a terminal differential amplifier stage.

The logarithmic amplifier stage converts the signals from the arms of the measuring bridge into a difference, which is expressed by a ratio in the differential amplifier and is unaffected by any drifts due to temperature, aging or other factors of the high-frequency generator and of the amplifier itself.

Advantageously, double synchronous switching is provided, between the output of the measuring bridge and the input of the differential amplifier stage, of the signal from the arms of the bridge, so as to use only one logarithmic amplifier for the first processing stage of the circuit. The signal from the arms passes alternately to the same logarithmic amplifier. The function is thus unaffected by the differential drift from the use of two logarithmic amplifiers, one for each arm measuring signal.

The alternating current measuring signals processed by the logarithmic amplifier are advantageously received alternately by said synchronous switching on a capacitive circuit storing the information at the input of the terminal differential amplifier stage, to be then picked up and processed by the latter.

Finally, said double synchronous switching is advantageously controlled by a square signal electric pulse generator.

The invention also relates to the probe used, that is, the assembly of the high-frequency line for measuring the height of a liquid in an associated tank and the circuit for processing the signal to determine said height of the liquid in the tank.

The invention is illustrated below by means of an exemplary embodiment and with reference to the appended drawing in which:

The single FIGURE is a schematic view of the electrical circuit of the probe according to the invention.

The drawing shows all of the probe used according to the invention to measure the height of a hydrocarbon type liquid in a tank, that is, formed by a high-frequency line 1 submerged in the liquid of the tank over its height and its electric measuring circuit 3.

The tank is not shown.

The measuring circuit 3 is represented schematically. It comprises a high-frequency power supply generator 5 (4 to 20 MHz), a bridge 7 for measuring the impedance of the line 1, a logarithmic amplifier 9 linked to the output of the measuring bridge 7, a differential amplifier 11 linked to the output of the logarithmic amplifier 9, a double synchronous switch 13 positioned between the terminals of the logarithmic amplifier 9 and an intermediate capacitive charge circuit 15 positioned at the input of the differential amplifier 11.

The measuring bridge 7 is a resistive bridge, comprising at the lower level the high-frequency line 1 for measuring the height, of the liquid (lower arm) and at the upper level (upper arm) a reference resistor 17, the value of which is roughly equal to the impedance modulus of the line, when the liquid of the tank is at mid-height in the latter. The value of this resistor can be equal to 2.5 times the characteristic impedance of the line, for example, between 100Π and 1 kΠ.

The line 1 is formed by a simple metallic rod (with open end) placed vertically in the tank and over the measuring height of the liquid in the tank. The distance from the line to the bottom of the tank can be a few centimeters, so as to insulate it from the impurities deposited at the bottom which can affect the measurement.

The synchronous switch 13 uses a first branch 13a to alternately transmit the signal respectively from the upper arm and from the lower arm of the bridge to the logarithmic amplifier for processing; synchronously, it uses another branch 13b to store the processed alternating current signal in two opposite branches 15a, 15b of the intermediate capacitive charge circuit 15 before transmission thereof to the final differential amplifier stage. This switching circuit is driven by a square signal electric pulse generator 19.

Thus, the signal measuring the impedance modulus of the line is compared to that of the reference resistor, the two signals are processed alternately, via the switch, by the logarithmic amplifier, are stored in the intermediate charge circuit, via the switch, in sequence on each change of pulse from the generator 19, and then are compared and processed in the differential amplifier to determine the height of the liquid in the tank.

At the upper switching output terminal of the bridge, the voltage being V1, and at the lower switching output terminal of the bridge, the voltage being V, after passage into the logarithmic amplifier, the processed signal respectively becomes $\alpha \log V1$ stored in the upper branch 15a of the intermediate charge circuit, and $\alpha \log V$ stored in the lower branch 15b of the intermediate charge circuit, $\alpha$ being a coefficient dependent on the logarithmic amplifier.

Then, the comparison signal processed in the differential amplifier becomes $G (\alpha \log V - \alpha \log V1) = G \alpha \log V/V1$ which takes into account the ratio of V and V1 to determine the impedance modulus of the line, which is mainly dependent on the height of the liquid in the tank, the permittivity of the liquid, the length of the line and the circuit power line frequency.

The height of the liquid is then calculated. The formula is known and is not explained here.

The measurement accuracy in the abovementioned field of application (high-frequency current power supply of 4 to 8 MHz, vertical straight-line rod probe from 0.1 to 10 m, hydrocarbon gas in liquid phase being measured) is better than 1%.

The above shows the advantageous application of the probe according to the invention in measuring the height or level of liquids in tanks and, in particular, low-permittivity liquids such as hydrocarbons in the liquid phase.

The invention claimed is:

1. A method of measuring the height of a liquid using a high-frequency line probe (1), wherein there is implemented, on an electric circuit (3), supplied with a high-frequency alternating current, a comparison between the impedance of a coaxial or non-coaxial line probe (1) and a reference resistor (17), using a resistive measuring bridge (7), the probe (1) being submerged in a tank of fluid the height of which is to be determined forming one measuring arm of the measuring bridge and said reference resistor (17) forming an opposite arm of the measuring bridge, the comparison generating a comparison signal resulting from the alternate measurement of the signal on each of the measuring bridge arms using a detector, and through processing the comparison signal in order to obtain the calculation of the height of the liquid according to its permittivity, the length of the probe (1) and the circuit (3) power supply frequency, the processing of the comparison signal being performed in two stages comprised of a logarithmic amplifier stage (9) followed by a terminal differential amplifier stage (11), wherein said processing of the comparison signal implements a double synchronous switching (13), between the input (13a) of the logarithmic amplifier stage (9), and between the output (13b) of the logarithmic amplifier stage and the differential amplifier stage (11), so as to utilize a single logarithmic amplifier stage (9) for the first processing stage of the circuit.

2. The measuring method as claimed in claim 1, wherein the probe (1) is formed by a straight tube, rod or metallic wire of any type which extends through the height of liquid in the tank.

3. The measuring method as claimed in claim 2, wherein the probe (1) has a vertical length of from about 0.1 to 10 m.

4. The measuring method as claimed in any one of the preceding claims, wherein frequency of the high-frequency alternating current supply of the circuit (3) of the probe (1) is within the range from about 4 to 20 MHz.

5. The measuring method as claimed in claim 1, wherein the reference resistor (17) is selected to be approximately equal to that of an impedance modulus of the probe (1) at a mid-height of the liquid contained in the tank.

6. The measuring method as claimed in claim 1, wherein alternating current measuring signals processed by the logarithmic amplifier (9) are received alternately via said synchronous switching on a capacitive circuit (15) with opposite branches (15a, 15b) at the input of the terminal differential amplifier stage (11), so as to be picked up and processed by the terminal differential amplifier stage.

7. The measuring method as claimed in claim 1 or 2, wherein said double synchronous switching (13) is controlled by a square signal pulse generator (19).

8. The measuring method as claimed in claim 1, wherein the liquid employed is a low-permittivity liquid.

9. The measuring method as claimed in claim 1, wherein the liquid employed is a hydrocarbon in a liquid phase.

* * * * *